(12) United States Patent
Wessner

(10) Patent No.: US 8,692,402 B1
(45) Date of Patent: Apr. 8, 2014

(54) SEAWEED (SEA-WAVE ELECTRICAL ENERGY DYNAMO)

(75) Inventor: Jeffrey John Wessner, Point Reyes Station, CA (US)

(73) Assignee: Jeffrey John Wessner, Point Reyes Station, CA (US)

( * ) Notice: Subject to any disclaimer, the term of this patent is extended or adjusted under 35 U.S.C. 154(b) by 508 days.

(21) Appl. No.: 13/065,239

(22) Filed: Mar. 16, 2011

(51) Int. Cl.
*F03B 13/10* (2006.01)

(52) U.S. Cl.
USPC .............................................. 290/53; 290/54

(58) Field of Classification Search
USPC ......................................... 290/42, 43, 52–54
See application file for complete search history.

(56) References Cited

U.S. PATENT DOCUMENTS

| | | | | |
|---|---|---|---|---|
| 4,748,808 A * | 6/1988 | Hill | ................................. | 60/398 |
| 4,832,571 A * | 5/1989 | Carrol | ...................... | 416/132 B |
| 4,849,647 A * | 7/1989 | McKenzie | ...................... | 290/54 |
| 6,616,402 B2 * | 9/2003 | Selsam | .......................... | 415/3.1 |
| 7,011,501 B2 * | 3/2006 | Lindberg | ........................ | 416/84 |
| 7,397,144 B1 * | 7/2008 | Brostmeyer et al. | ............ | 290/53 |
| 2012/0212350 A1 * | 8/2012 | Magnell | ........................ | 340/850 |

\* cited by examiner

*Primary Examiner* — Tho D Ta

(57) ABSTRACT

An electrical generator using ocean wave and current forces to spin a turbine mean and alternator connected together by a flexible shaft. An electrical generator that takes its inspiration from a giant kelp plant that bends in wave or current forces thus presenting its turbine blades at the right angle to the force. A resilient flexible turbine generator of small stature resembling an ocean surf zone macrocystus which (instead of float and fronds) has a turbine floating at its top-most end and an alternator anchored to the ocean floor, both connected by a force transmitting flexible shaft. Ecologically friendly, turbo generator designed to be "ganged" into a "forest" of similar devices to harness the forces inherent in ocean waves and currents.

1 Claim, 1 Drawing Sheet

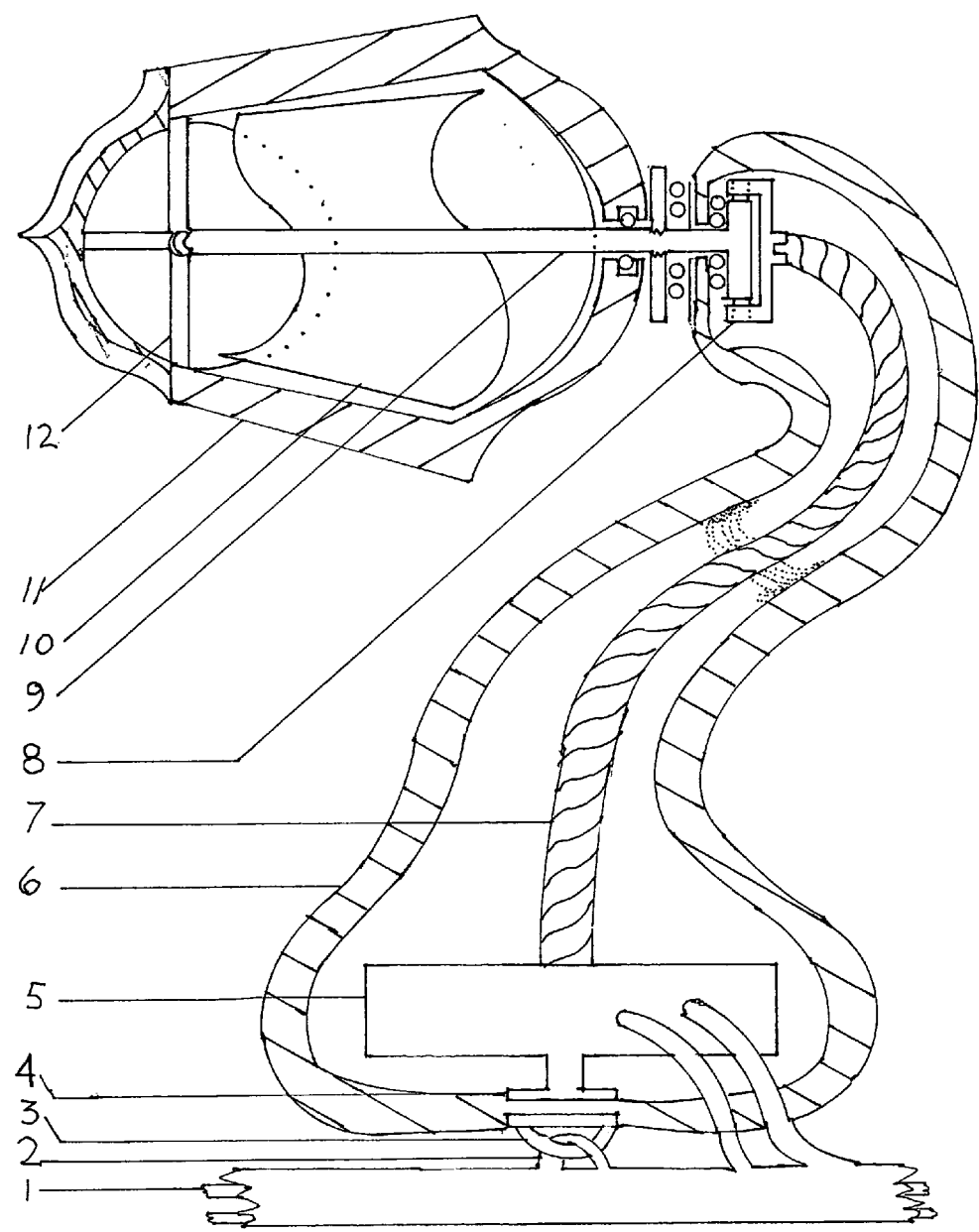

SEAWEED (SEA-WAVE ELECTRICAL ENERGY DYNAMO)

BACKGROUND OF INVENTION

Prior Art

The following is a tabulation of some prior art that presently appears relevant:

| | U.S. Patents | | |
|---|---|---|---|
| Pat. No. | Kind Code | Issue Date | Patentee |
| 4,832,571 | 416/318 | May 23, 1989 | CARROL |
| US2009/0243293A1 | 290142 | Oct. 1, 2009 | FARB |

Industrialized human society is searching for alternatives to common electrical energy generating schemes. Hydroelectric, geothermal, fossil fuel, and photo voltaics, are just a few examples of many devices and methods of creating electricity; originally electricity was produced in quantity by directing falling water across turbine blades which in turn spun, a coil of wire inside a magnetic field. Most hydroelectric dam site have been exploited; depleting sources and pollution concerns foretell the limits to fossil fuels usefulness in making steam to drive turbines used in electrical generation. Solar and wind are poised to take a major role in filling modern man's needs yet wise men and presidents continue to call for innovation in energy production. Responding to this call and the obvious value present in developing electricity, the present inventor proposes a new method and design, a new approach, a novel system to extract (if you will) electricity from the forces available in ocean waves and tidal currents and river flow. These forces were demonstrated to me while diving for abalone, an ocean mollusk, which live in fosters of sea kelp. Under the crashing surf tossed by surging current, I witnessed, first hand, the forces available in ocean waves made evident by the motion of the macro cystus kelp.

Man often thinks big when trying to envision electricity production sufficient to our need; the scale of demand seems to force the inventive mind into "mega" solutions to our hunger for voltage. Perhaps this perspective is the reason so few utilitarian mechanisms utilizing wave energy have been built. I have invented a small machine that functions in (perhaps) the earth's most violent and turbulent environment. This environment would shortly beat up and destroy most of man's materials and designs if they were set out to collect the energy.

Being small, flexible, resilient, movable and unintrusive, the Seaweed (sea-wave electrical energy dynamo) is a practical device to make electricity.

Engineers have designed and built structures to withstand tremendous natural forces and convert them to usable energy. Hydroelectric dams and turbines are such installations harnessing water power. Research reveals innovative ideas ands drawings of proposals to use water forces and convert them into useable electricity. To date, very few have been built. Too often applications such as Farb, ((pub. No. U.S. 2009/0243293 et al.), which seems to throw up every possible road block to patents in this field), show no sensitivity to the negative environment consequences of their theoretical constructions. Unlike such curious ideas, the Seaweed is a real machine that works and takes into consideration the consequences of its deployment.

Time has come to get "real" vis-a-vis wave and current generated renewable electricity. The simplicity and light footprint of the present invention is appropriately respectful of the ocean, inexpensive enough to build, and applicable to many wave and current rich locations.

BACKGROUND OF THE INVENTION, ADVANTAGES

According to the previous discussion, advantages can be seen with the Seaweed: Price of construction and ease of installation as well as mobility and minimal impact on the environment, number among the most important advantages. As few (if any) devices which use the surf zone energy to create rotational energy have been construction, it is hard to establish an advantage as prior art is nearly nonexistent. Limited examples of predecessors causes the discussion of advantages to change from advantages to the reason why nothing of significance has been accomplished in this area of the field of electrical generation from ocean wave forces. Turbulent conditions prevail in the surf zone. The present invention takes its invention inspiration from the rugged design qualities of the indigenous giant kelp. Evolving to thrive in this inhospitable environment, the giant kelp (rather than fearing the tempests) thrives and excels in these complex and extreme forces. Whipped and tossed in the waves it is the life of the seaweed to be tossed by the hurricanes. Performing like the whip of a lion tamer, the seaweed, theoretically, generates its greatest amount of electricity in the worst conditions; and when the chaos has passed the weed resumes its rhythmic oscillations.

Environmentally, the Seaweed may improve living conditions in areas of its employment. Acting as cover for small animals and fish the Seaweed complex of many machines may be looked upon as a reef or kelp garden. If any environmental concerns arise or if periodic relocation of the many units is determined to be needed for the health of the ocean, the Seaweed can be easily moved allowing any detrimental effect to heal. An inherent "light footprint" and natural appearing posture and action makes the Seaweed not much different than a transplanted organism. The Seaweed's greatest advantage is the fact that it makes electricity. Depending on the unit size, each Seaweed will make many waits of power in a sinusoidal wave form. A constant, steady amperage would be experienced when several weeds were connected along a surf line and because the waves break in a pealing fashion or procession the energy produced would appear constant. Another advantage to be considered at this time is the relative cheapness of manufacture. The potential loss of one or even many of the plurality of weeds in a weed forest would be negligible once the weed became established. Fields of weeds could be mowed down by wrecked ships or dead whales or tsunamis; replacement could be accomplished without much time or money spent.

Advantages over the prior art are many. Many ideas and inventions have been suggested to utilize the forces in waves and current. To date the Seaweed is the one that is not gigantic in size and scale. In fact, the Seaweed is small and to the scale of the actual plant that it tries to mimic. This small structure is the real improvement over the earlier and insensitive devices. The surf zone is fragile, it is a home for a myriad fish, plants and animals. This area of the ocean is the most productive and consequently the most sensitive area in the sea. Sensitivity to the delicate balances that exist in the surf zone is the first step that is necessary to getting access to this energy rich area. Environmental concerns are the most important issue to be overcome in an intelligent and non-confrontational way. The small size and non-toxic nature and construction of the Seaweed is the secret to its success in overcoming prejudices to placing machinery in the ocean for extracting energy.

Precious few hydro electric turbines are harnessing wave forces. Research shows innovative ideas and proposals to get to the available force and convert them into electricity. Why aren't there more? Ego and man's drive for "big" solutions to problems may be causing engineers and designers to miss the obvious; the obvious is that the surf zone is no place for stationary or large anchored structures, but rather the surf zone is a place for the Seaweed. Patterning itself after the prehistoric inhabitants of the surf zone, the Seaweed takes its inspiration from the plants that have evolved to withstand the forces in this most dynamic environment.

Another final advantage comes to mind as I wrap up this section of my application: jobs, interesting, highly skilled and worthwhile jobs in the manufacturing and maintenance fields. The Seaweed offers the possibility of an entirely new industry that makes money from ocean dynamics. The opportunity for men and women oceanographers, divers and technicians, and electricians will be available. HUNDREDS AND PERHAPS THOUSANDS OF INDIVIDUALS WILL BE EMPLOYED BY THIS NEW FORM OF WEALTH MAKING. Each paying taxes and buying school books for their children.

SUMMARY

The present embodiment (known as the Seaweed) is a practical and environmentally sensitive means to harness the forces found in the ocean waves and tidal currents. Research has showed that some of the schemes that have been proposed for patenting are fantastical. Perhaps someone in the field of marine construction could build a number of these Rube Goldbergian ideas, who would want to? A basic sensitivity to the forces at work in the surf zone is fundamental before an ocean-using device can be practically envisioned. A surfer, who is also an engineer, would be the type of person best suited to make an ocean-powered generator. A diver or a spear fisherman would have the practical experiences necessary for envisioning tools that would turn waves into rotational motion, and then electrical power. The complicated and dazzling schemes that have been patented heretofore are impressive in their complexity; however, someone who surfs on these waves or dives under them to spear fish is the right person to envision useful devices and would know what the engineer is up against when designing for this demanding environment. If you have watched an expensive yacht wash ashore after being sunk by a storm, you know what the ocean can do to the best that man can build. Each joint, each connection, every splice, every lamination is worked apart. Nothing can stand the fury of the surf. When the sea turns black and grey and changes the landscape in its wake, no machine made by man is capable of managing all the different moods and temperaments of the earth's largest thing. Only the humble limpet, or perhaps the crab or snail, can survive the pounding and these maters of ocean survival all succumb to the ocean eventually. It is arrogant and ignorant to assume that a man-made structure placed in the ocean can endure the ripping and tearing that undermines the footings of all ocean installations. An examiner that is qualified to judge upon the efficiency of an ocean energy device should have had gone to sea or worked at the bottom of the ocean as a welder or rigger. Only then would one have the experience to recognize the frailties of human construction in the face of the ocean's ever changing, ever shifting force. It is with this humility that I have gathered a lifetime of aquatic experiences and in an insightful flash of creative clarity stemming from surviving extreme surf conditions have I come to propose the present embodiment as a practical and useful machine to turn wave forces into electricity.

The first and best observation necessary is that nothing will last long in the ocean. If the waves and wind don't disable a device, corrosion will. If a whale carcass doesn't fowl its works, a mat of dislodged kelp will. In none of the above defeats a system in the surf zone, environmentalists will. There is no permanent answer to electrical generation from the sea. The best strategy would be to make a device that is expendable, refurbishable or replaceable and removable. The Seaweed answers this "temporariness" paradigm. The Seaweed is not big, it is not strong. The Seaweed is made to fail because everything in the ocean breaks down eventually. This frailty and impermanence is Seaweed's strength and enduring quality. It is like an ever regenerating sea plant that grows to take advantage of its environmental but never attempts to control it.

The Seaweed is simple, not a one-cell organism yet not much more. Approximately 15 separate parts comprise this organism called the Seaweed. Just enough to make rotary motion for its onboard alternator to transition into electricity, but not too complicated to make the Seaweed more expensive than $50,000 in 2011 money. The Seaweed has a functional life span; like its natural brother, the macrocystis, it is washed ashore when it can no longer do work. There the weed is collected and dismantled for its reusable parts and restored to usefulness and, in due time, returned to the hold fast for new service. A life span of one year might be an appropriate expectation. Just enough to be of service as a practical alternative to non-renewable energy.

Ramifications

The reader will see that at least one embodiment of the Seaweed provides an important alternative to nonrenewable energy sources, but this should not be construed as a limitation on its scope. Many other variations are possible.

This type of invention is an electrical generator. The present invention transforms forces inherent in waves and currents into rotary motion. Rotary motion has been employed for hundreds of years to do work; in the electrical age this motion has turned coils of wire in magnetic fields to produce electricity. Prior art would include hydroelectric dams, gas turbine generators and a myriad of other developments in the past to produce electricity. The purpose of my invention is to generate electricity by using ocean wave action primarily; however, river currents and tidal channels exhibiting tidal currents would be ideal environments in which to employ this embodiment. The invention itself is constructed from a combination of neoprene or other flexible closed-cell floating rubber, steel coil in the form of a flexible shaft, fan blades, and floating cowling that acts as a channeling force concentrator. These major elements are connected to an alternator, and all are anchored at the bottom of the ocean in the surf zone. Each individual electricity making machine is connected in series to the next to collect the manufactured energy. The Seaweed works by bending in front of the overtopping wave force. As the structure bends its fan is made to be at right angles to the wave energy. This perpendicular attitude allows the moving water to impinge on the fan blades causing them to turn. The spinning motion is transferred via a flexible shaft to an alternator positioned at the lower extremity of the machine. This bottom end rests on an anchor block positioned on the ocean floor. The alternators direct connection to the flexible shaft takes the spinning forces and causes them to turn a coil of wire in a magnetic field, thus inducing current of varying voltage and amplitude in the conduit connecting the device to the load. As is indicated in the drawing attached, a combination of familiar materials and components are assembled in an inventive and heretofore never been done manner to create a machine which develops electricity. This applicant knows that there is nothing new about electricity, nothing novel about a spinning armature; however, this applicant preys that the inspector will recognize the unobviousness of the coupling of these components and deem them to be a new method of generating electricity. Flexibility and resilience characterize the present invention. Only by being resilient can a device that extracts electricity survive the turbulence in the surf zone. Any attempt to create a static structure strong enough to withstand the forces of the surf zone, would be intrusive and environmentally and aesthetically wrong. Conversely, the Seaweed appears as no more than an ocean algae; a macrocystus look alike with (instead of float and fronds) a wind sock wave concentrator. When the ocean forces crash, the turbine shaft bends back and as the wave passes, the blades spine with abandon and in the ebb of the wave sets the Seaweed (like its natural progenitor) rights and reorients itself to face the next set of oncoming waves.

DETAILED DESCRIPTION

FIG. 1 Shows a profile view of one version of the Seaweed (Sea-wave Electricity Extraction Dynamo). FIG. 1 illustrates a machine that mimics, in movement, giant kelp. The long vertical stalk of the kelp plant is copied using a sheath of neoprene (or similar) closed cell expanded foam. This watertight sheath houses an alternator at is bottom extremity. Connected to the alternator is a flexible shaft (similar to the flex shafts on bench grinders or those used in rooter sewer operations). The flex shaft is connected to a rigid shaft upon which is affixed a fan blade or turbine assembly. The sheath of neoprene (wet suit material) terminates on the fan shaft in a combination of seals and packing that employs "knife seals and heavy packing grease working in combination to stop leakage. Finally (attached to the packing area and solid shaft) is a float that is fashioned to act as a flow concentrator; this (wind sock-looking device) buoys the vertical stalk and makes the fan buoyant. In undisturbed waters, the Seaweed stands erect; as current and waves impinge upon it, the Seaweed bends to give way to the forces in the waves; this bending changes the attitude of the Seaweed fan assembly causing it to lay on its side in the stream of current in a perpendicular position holding the fan blades at right angles to the current, causing the blade to spin. The spinning blades turn the axle and universal joint connected to the flexible shaft which transmits the rotary motion down the "stalk" to the alternator which spins and produces alternating current which is transmitted over wires in a series connection that bundles multiples of Seaweeds to magnify their energy to do useful work.

Using modern materials and technology an approximation of the giant kelp has been constructed to extract natural forces from waves and current. The importance of bending so as not to break is the essence of the seaweed plant. This quality is utilized in the design in the present turbine generator. As the force of waves (created by wind far out to sea or currents cascading from mountains or generated by the tides) bend the resilient generator, the hidden energy within is turned into rotary motion and transferred by flexible shaft to an alternator producing alternating current. The following specification (I pray) will clarify the method and design employed to extract electricity (a prime over) from natural and renewable waves and currents.

Seaweed, "Wave Electric Energy Dynamo"

The world is using electrical energy at an ever increasing rate. New methods to generate electricity are being developed to reduce costs and keep up with demands for electrical power. The present embodiment is a practical method to make alternating current from ocean waves and currents.

Operation of the Preferred Embodiment

The ocean wave electricity extraction dynamo works as a turbine generator. Fabricated out of materials which allow it to bend with the forces of the oncoming wave or current. The bending quality has two functions; one is to orient the turbine blade at right angles to the motive force, and the second quality of the bending allows the machine to withstand the constant pounding of the wave sets. Rigid structures in the surf zone are soon to fail from metal fatigue or other breakage.

The operation description begins at the bottom where the Seaweed is anchored to the ocean floor in the surf zone.

An anchor (1) cable or heavy block similar to moorings for boats, lay at the sea bed. A latch (2) that is releasable is situated on the top and in the middle of the anchor block or cable; a ring (3) connects the Seaweed to its "hold fast" anchor. The ring that is attached to the releasing latch is permanently affixed to the bottom of an alternator (5) before the attachment, a watertight seal (4) is fashioned around this connection to disallow any leakage the watertight seal is integral to a neoprene sheath (6) which encases and shapes the Seaweed. The sheath is cut and glued to approximate the appearance of a giant kelp plant. The neoprene sheath is long on its vertical axis and rises by buoyancy to the surface and encases a flexible shaft that is attached to an alternator. (7) this flexible shaft is supple and bends and deforms according to the forces put on it. At the top of the neoprene sheath (6) a universal joint (8) connects the flexible shaft with a rigid shaft (9) which has affixed to a propeller (10). The propeller (10) is held inside a tunnel shaped collecting (wind sock) shaped force concentrator (11) by spokes (12) that spread the concentrator and holds the rigid shaft in the center. The wind sock force concentrating tunnel acts as a floatation device that buoys the entire Seaweed structure in a vertical attitude until the wave action bends it over. The foregoing discussion about the assemblage of the Seaweed in no way presumes that a simple construction of the individual parts is the only method that will render the best results. Just as a vehicle with four wheels and an engine can be called a car, this combination may not be capable of a world land speed record. So, too, the assemblage of the Seaweed may and probably will need tuning before an efficient combination is found. As with so many true inventions, many unforeseen variables will be discovered, anticipating just a few, I write some down in an attempt to convince the inspector that I believe the Seaweed can be improved upon but the rule of obviousness will prevail as the inspector learns the inventor is humble to the face of the most important rule in invention, i.e., practice makes perfect.

DESCRIPTION OF THE INVENTION

The present embodiment is a unique arrangement of well understood parts. Common, useful machinery are combined in a balanced and functional manner to approximate the shape and action of the macrocystis or giant kelp. At the top of the erect floatation posture the present embodiment employs a fan-like turbine and a channeling tunnel that functions as floatation taking the position of the bulbous float and fronds of the giant kelp. Neoprene or other buoyant material is fashioned to encase an inner core consisting of a flexible shaft.

The neoprene-like material insulates the central core from the aquatic environment where the device is intended to do its work.

In the past, inventions have modeled their functionality from nature; perhaps the most obvious is the airplane wing, being modeled after the bird wing. The present embodiment copies (as best it can) the flexible resilience of the erect standing giant kelp. A wonder of evolution, the kelp plant survives the violent forces present at the terminus of the ocean waves. In the surf zone, kelp plants bend in the waves and regain their upright posture in between the wave sets. This giving in and then regaining its verticality allows for the long life span of the giant kelp; a rigid (unbending) structure would not be able to withstand this violent environment, only monumental structures such as concrete and steel jetties last long in the pounding surf but bring with them many environmental problems. A machine that mimics the swaying action of the seaweed has the ability to survive a useful time. A relatively small structure and a relatively light structure lends itself to easy employment and repair whereas a large structure designed to extract the tidal and wave forces tend to change the environment and present maintenance and ecological problems. The present embodiment is intended to be anchored in an energy-rich location at the point just before the wave crests and breaks on the shore, or in a current in a river or in a tidal area where periodic currents can be harnessed. As the drawing shows, the topmost floating element is a housing or inlet cowling for a turbine means that is activated by the flow of waves crossing over the several blades; a plurality of blades are attached to the central drive shaft which is connected to the central flexible shaft, by a universal joint. The rotary motion that is created by the turbine blade is transferred down to the base of the vertical stalk where it connects to an alternator; finally the entire assembly is attached to an anchor. This connection allows for disconnection and repair. The entire structure is encased in a watertight skin. This neoprene (or other equally floatable, closed cell material) protects the interior works and aids in floatation causing the flexible shaft to stand erect and vertical in the water. While knife seals and packing (like through hull fitting on ship drive shafts), inhibit leaks, the turbine assembly floats awaiting the next wave to spin its blades. When many such embodiments are "ganged" together, the output becomes constant rather than the on and off quality of just one Seaweed. In the real world the weed-like structure would be placed in the ocean by the hundreds or thousands not only producing tremendous amounts of alternating current but they are moveable and repositionable to satisfy needs for repair and also relieve the ecology from constant intrusion by moving the Seaweed forest. Portability, relatively light weight, relatively inexpensive and non-intrusive and ecologically neutral, the Seaweed, ocean wave and current activated electrical dynamo, is yet another answer to the growing need for energy.

The invention claimed is:

1. An ocean wave and current driven electric energy producing machine comprising:
   a turbine having a propeller sufficient to be turned by ocean wave forces and currents;
   a buoyant concentrating tunnel cowling for supporting said turbine;
   an alternator;
   a flexible shaft having one end attached to said turbine, and the other end attached to said alternator; wherein said flexible shaft transferring rotary motion of said propeller to said alternator, wherein said alternator transforms said rotary motion of said propeller into electricity;
   a closed cell buoyant and watertight casing of tapered-shape encases and protects said flexible shaft and said alternator, said casing helps keeping the entirety of said ocean wave and current driven electric energy producing machine upright until the wave forces bend said casing causing said turbine to lay at right angles to the wave forces and to spin said propeller; and
   a latch connecting said closed cell buoyant and watertight casing of tapered-shape to an anchor secured on a bottom of the ocean;
   wherein the ocean wave and current driven electric energy producing machine designed to function similarity to a giant kelp plant that survives in an ocean surf zone.

* * * * *